3,052,648
PREPARATION OF COPOLYMERS USEFUL AS DISPERSANTS IN OILS

La Verne N. Bauer, Cheltenham, Pa., assignor to Rohm & Haas Company, Philadelphia, Pa., a corporation of Delaware
No Drawing. Filed Feb. 29, 1960, Ser. No. 11,430
12 Claims. (Cl. 260—45.5)

This invention concerns a method for preparing oil-soluble copolymers which provide detergent and dispersant actions in oil systems. These copolymers have markedly better detergent and dispersant actions than copolymers prepared in the classical way of mixing comonomers and acting upon them with a polymerization initiator even though identical comonomers and proportions are used.

It has previously been proposed to prepare copolymers by mixing and polymerizing together one or more polymerizable compounds and a polymerizable polyether ester, such as an alkoxypolyethoxyethyl acrylate or methacrylate. In an alternative procedure it has been proposed to saponify a portion of the ester groups in a polymer based on one or more polymerizable esters, such as alkyl acrylates or methacrylates, convert the resulting salt groups to carboxylic acid groups, and esterify these with a monoether of a polyglycol.

When these copolymers are examined by special test procedures, some of them give evidence of dispersing action. On the other hand, when a more rigorous or severe test is applied, these polymers exhibit either feeble activity or no activity.

It has now been discovered that reproducible results can be obtained in accordance with the method of this invention with production of copolymers which exhibit in rigorous tests very good dispersing action. This method comprises initiating free radical polymerization first of at least one free radically polymerizable monoethylenically unsaturated compound having an oil-solubilizing group until 40% to about 90% of the monomer has been polymerized, whereby a polymerizing mixture containing both monomer and polymer is formed, adding to this polymerizing mixture and copolymerizing therewith under the influence of a free radical polymerization initiator at least one ether ester of the formula $$CH_2=C(R^*)COO(C_nH_{2n}O)_x-R$$

wherein $R^*$ is hydrogen or methyl, $n$ is an integer of 2 to 3, $x$ is a number of at least two, usually two to thirty, and R is alkyl, cycloalkyl, aralkyl, phenyl, $R_1R_2NC_nH_{2n}-$,  $R_1SC_nH_{2n}-$, and $R_1COOC_nH_{2n}-$, where $R_1$ and $R_2$ represent alkyl of one to twelve carbon atoms each, preferably one to eight, cycloalkyl, or benzyl groups and $n$ has a value of two to three.

Ether ester is supplied to provide about 5% to 50% of the final copolymer, preferably 8% to 30%.

Typical groups represented by R include methyl, ethyl, butyl, hexyl, octyl, or dodecyl, cyclopentyl, cyclohexyl, methylcyclohexyl, butylcyclohexyl, benzyl, methylbenzyl, phenyl, methylphenyl, butylphenyl, methylbutylphenyl, octylphenyl, and nonylphenyl, dimethylaminoethyl, dimethylamino-2-propyl, dimethylamino-3-propyl, dibutylaminoethyl, N-methyl-N-benzylaminoethyl, dicyclohexylaminoethyl, cyclohexylthioethyl, benzylthiopropyl, methylthioethyl, methylthiopropyl, butylthioethyl, octylthioethyl, dodecylthioethyl, tert-tetradecylthioethyl, acetoxyethyl, acetoxypropyl, butyroxyethyl, butyroxypropyl, octanoyloxyethyl, dodecanoyloxyethyl, or hexahydrobenzoxyethyl. In general, the substituent R does not contain over 12 carbon atoms in the longest chain and is preferably 1 to 8 carbon atoms.

An advantage of the process of this invention is that it makes possible in a practical way a considerable choice among the monomers which are first polymerized to give a mixture of polymer and monomer. The first formed polymer is conveniently identified as the base polymer. It may be a homopolymer or a copolymer. The more usual materials for providing the base polymer comprise esters of acrylic, methacrylic, itaconic, maleic, and fumaric acids or vinyl carboxylates or mixtures of these or mixtures of one or more of these with one or more other polymerizable ethylenically unsaturated compound. These other compounds include such monomers as alkyl esters, olefins, vinyl ethers, vinyl thioethers, vinyl lactams, styrene, and alkylstyrenes, which by themselves do not provide base polymers of sufficient molecular size, oil-solubility, or utility, but which can be used as comonomers along with the above more active monomers.

Perhaps the most important group of starting monomers comprises acrylic esters. There are readily available alkyl acrylates and methacrylates from methyl through octadecyl to even larger alkyl groups, as with 20 to 24 carbon atoms. In general the size of alkyl groups or the average size of alkyl groups in a mixture of acrylic esters is selected to ensure solubility of the final copolymer in the oil in which it is to be used at the desired concentration.

Typical esters promoting solubility include octyl, nonyl, decyl, undecyl, dodecyl, tetradecyl, hexadecyl, and octadecyl acrylates and methacrylates, although larger alkyl esters, such as eicosyl, behenyl, and tetracosyl, may also be used. Esters with smaller alkyl groups may also be present in starting mixtures, these including methyl, ethyl, propyl, isopropyl, butyl (in its various forms) amyl, hexyl, and heptyl acrylates and methacrylates. Likewise there may be used in forming the basic polymer acrylic esters containing a cycle as in benzyl, cyclopentyl, cyclohexyl, dicyclopentyl, phenyl, or alkylphenyl acrylates or methacrylates.

Similarly, in the formation of the first polymer there may be used in minor proportion at least one polymerizable ester in which the alcohol residue contains at least one heteroatom, in particular nitrogen, sulfur, oxygen, or phosphorus. Typical groups of this sort containing oxygen are ethoxyethyl, octoxypropyl, butoxybutyl, phenoxyethyl, octylphenoxyethyl, nonylphenoxyethoxyethyl, cyclohexyoxyethyl, benzoxyethyl, tetrahydrofurfuryl, tetrahydrofurfuryloxyethyl, or even those with more oxygen atoms between alkylene group or groups and/or other hydrocarbon substituent. Ether esters used in this way do not supply the extent of dispersing activity desired, although they may contribute.

Comparable thio-containing groups forming useful co-monomers include butylthioethyl, octylthioethyl, tetradecylthioethyl, dodecylthioethoxyethyl, phenylthioethyl, benzylthioethyl, and the like.

Amino-containing residues may be illustrated with dimethylaminoethyl, dibutylaminoethyl, tert-octylaminopropyl, or dimethylaminoethoxyethyl.

Typical of residues containing phosphorus are dibutylphosphitoethyl, 2-diethylphosphitopropyl, or diethylphosphitobutyl, such as shown in U.S. Patent 2,934,554, or diethylphosphonomethyl such as shown in U.S. Patent 2,934,555.

Another useful type of starting monomer comprises vinyl esters of monocarboxylic acids. Here oil solubility can be controlled by the size of the hydrocarbon portion of the acid residue. If such ester or mixture of such esters is used to form the base polymer, it is usually desirable that the average group size be at least eight carbon atoms. The vinyl esters may, however, vary from vinyl acetate upward through vinyl stearate or larger. Use of vinyl acetate or vinyl propionate is particularly desirable in building up base polymers in conjunction with less readily polymerizable monomers such as itaconates, maleates, and fumarates. Vinyl carboxylates can, of course, be used as comonomers also in conjunction with acrylic esters.

Alkyl fumarates may also be polymerized without the presence of another polymerizable ethylenically unsaturated compound, as may also alkyl itaconates. The alkyl substituent or substituents of such an ester or mixture of esters may contain one to 24 carbon atoms with the effective or average size being sufficient to ensure solubility of the final copolymer in the oil in which it is to be used. In general, an average size of at least about eight carbon atoms will ensure oil-solubility.

Fumarates and especially maleates are most advantageously polymerized in conjunction with at least one more readily polymerizable monomer, such as acrylic esters, vinyl esters, or a styrene, including not only styrene itself but ring-substituted vinylbenzenes and vinylnaphthalenes.

Along with the above starting monomers there may be used, usually in minor proportions, other polymerizable monovinylidene compounds such as acrylic, methacrylic, or itaconic acids, maleic anhydrides, half esters of maleic, fumaric, and itaconic acids and a monohydric saturated alcohol supplying a methyl, ethyl, butyl, octyl, including isooctyl and other branched octyl groups, lauryl, cyclohexyl, benzyl, or like group, half amides of these dicarboxylic acids with an N-substituent such as an alkyl group of 1 to 12 carbon atoms, a phenyl group, a benzyl group, or a cycloalkyl group, acrylonitrile, methacrylonitrile, vinyl ethers and thioethers, and acrylamides and methacrylamides.

It is known that, whereas vinyl ethers do not polymerize well by themselves under conditions of free radical initiation, they copolymerize well with more active vinylidene compounds and can, therefore, be used effectively as minor components. Typical vinyl ethers include vinyl butyl ether, vinyl butyl thioether, octyl vinyl ether, dodecyl vinyl ether, or tetradecyl vinyl thioether. Other vinyl alkyl ethers or thioethers or vinyl phenyl, vinyl cycloalkyl, or vinyl benzyl ethers or thioethers may likewise be used. Similarly, there may be used minor proportions of vinyl ketones, or vinyl chloride or vinylidene chloride. Typical amides include acrylamide, methacrylamide, N-methyl-, N-octyl-, N-dodecyl-, N-cyclohexyl-, N-phenyl-, N,N-dimethyl-, N,N-dibutyl-, N-methyl-N-benzyl-, and N-butoxymethyl-acrylamides or methacrylamides.

In the method of forming the dispersant copolymers, one or a plurality of the starting monomers or a mixture of two or more types of polymerizable monoethylenic compounds is treated with an initiator, such as hydroperoxide and a quaternary ammonium compound as activator. At this stage, however, polymerization may also be initiated with an organic peroxide or an azo catalyst in known manner. While the polymerization may be effected in bulk, the monomer or monomers serving as their own solvents at least at the start, it is generally better to supply an inert organic solvent in which the polymer is soluble, particularly as polymerization proceeds. This decreases the viscosity of the mixture and permits more efficient mixing as by stirring or other means of agitation.

Convenient solvents are aromatic hydrocarbons such as xylene, benzene, toluene, and aromatic naphthas, chlorinated hydrocarbons, such as ethylene dichloride, esters such as butyl acetate or ethyl propionate, and also petroleum oils which are free of inhibiting or interfering impurities. The solvent may be retained in the final polymer or may be stripped off. It is usually desirable to displace from the final polymer a volatile solvent with a good quality oil—such as a 100 or 150 neutral oil—to give an oil solution of the final polymer.

On the other hand, there may be used as a solvent a relatively non-volatile organic liquid such as dibutyl sebacate, dioctyl sebacate, dioctyl azeleate, tributyl phosphate, tricresyl phosphate, silicate esters, or silicone fluids. It may be desirable to use such liquids as solvent when the final copolymer is to be used in liquids of this sort.

The first monomer or mixture of monomers is heated with the initiator at temperatures between about 60° and 150° C., depending in part upon the choice of initiator. Polymerization may be started at one temperature and continued at another. Additions of polymerization initiator may be made at the stator or they may be made from time to time.

There are possible variations in the way of effecting formation of the base polymer. If desired, the entire charge of initial monomer or monomers may be made at the start. Alternatively, part of the initial monomer or monomers may be charged to a reaction vessel and the rest added in one or more portions. Increments of initiator or initiator and activator, if so desired, may be supplied along with such portion or portions.

As initiator, there is preferably used at least one organic hydroperoxide such as tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide, and other tert-alkyl hydroperoxides and hydrocarbon-substituted benzene hydroperoxides. When a hydroperoxide is used at the start, its effect may be carried through the whole process or it may be supplied in increments in the several stages of the process.

In conjunction with a hydroperoxide it is desirable, but not absolutely essential, particularly in the formation of the base polymer, to supply an activator. Its effect seems at least in part to provide free radicals at somewhat lower temperatures than are effective for free radical formation from hydroperoxides, in the absence of such activator.

Especially effective as activators are quaternary ammonium compounds which are soluble in the polymerizing mixture. Typical compounds of this sort are benzyltrimethylammonium chloride, dibenzyldimethylammonium bromide, butyldimethylbenzylammonium chloride, octyltrimethylammonium chloride, dodecyldimethylbenzylammonium chloride, nonylbenzyltrimethylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, diisobutylphenoxyethoxyethyldimethylbenzylammonium chloride, cetylpyridinium chloride, N-octyl-N-methyl-morpholinium chloride, or bis-quaternary salts, such as those having quaternary nitrogens linked with an alkylene group, an ether group, or an amide-containing group.

In place of a hydroperoxide there may be used other free radical polymerization initiators, typical of one type of which are the peroxides, such as benzoyl peroxide, acetyl peroxide, lauroyl peroxide, di-tert-butyl perphthalate, tert-butyl perbenzoate, 2,2 - bis(tert-butylperoxy) butane or methyl ethyl ketone peroxide. Likewise, there may be used an azo catalyst such as azodiisobutyronitrile, azobisdimethylvaleronitrile, azodiisobutyramide, azobis($\alpha$-ethylbutyronitrile), or azobis($\alpha,\gamma$ - dimethylcapronitrile). In one effective variation of procedure one of the above catalysts is used in the first stage and a hydroperoxide, preferably in conjunction with quaternary ammonium compound, is used in the second stage, but any single type of initiator may be used at all stages.

The amount of initiator or of initiators should be between 0.01% and about 5% of the weight of the comonomers. In the first stage it is preferable to use from 0.05% to 2.5% of initiator based on the weight of monomer or monomers there used, unless it is desired to produce polymer of low molecular weight, in which case even more than up to 5% may be desired. In the second stage it is desirable to supply from about 0.1% to 1% of the hydroperoxide catalyst, although, as has been noted, the charge of hydroperoxide may also be supplied at the start of the process as well as at the second stage.

The amount of activator is proportioned to the amount of hydroperoxide. Usually, the proportion of quaternary ammonium compound will be from 5% to 40% of the weight of the hydroperoxide.

When in the first stage the monomer or monomers have been polymerized to an extent of about 40% or more, addition of polymerizable ether ester is made. It may be added in one portion or in increments. At this stage additional polymerization initiator is usually desirable to develop final copolymers with the optimum dispersing activities.

In a series of preparations in which the extent of polymerization was varied over a wide range it was found that at least 40% of the initial monomer should be polymerized before addition of ether ester, if dispersant activity by a rigorous test was with certainty to be present in the final copolymer. On the other hand, it was also discovered that if polymerization was carried to about 90% or more, the final copolymer was less useful and was less reproducible. The practical upper limit was found to be 85% for best results. If polymerization has been carried too far, polymerizable monomer may be mixed with the polymer.

For purposes of determining the extent of initial polymerization, there may conveniently be used a simple method which comprises isolating the polymer from the reaction mixture, as by removal of a volatile solvent. Estimation of the extent of formation of base polymer is particularly desirable in establishing the proper time of copolymerization for a given system in which proportions of initiator, concentrations, and temperatures are fixed.

In one useful form of test for extent of polymerization, a one-gram sample of polymerizing mixture is taken and dissolved in 5 ml. of benzene. The resulting solution is mixed with 15 ml. of methanol. Polymer precipitates and is separated by centrifuging. Polymer may be taken up again in benzene and reprecipitated in methanol to give a pure polymer. In some cases it may be desirable to reprecipitate as many as five times. The purified polymer is taken up with a little pentane and filmed on the inner walls of a tared tube. The tube is heated in an oven at 150° C. for 15 minutes. The weight of polymer is then determined and the percentage polymerization calculated.

After 40% to about 85% of the initial monomer or monomers have been polymerized and the polymerizable ether ester has been copolymerized with the base polymer, the final copolymer may be isolated, if so desired, by stripping off a volatile solvent or by precipitating the copolymer with an organic solvent which is a non-solvent for the copolymer. The precipitated copolymer may be washed with a volatile non-solvent and dried. On the other hand, it is usually more convenient to take up the final copolymer in a liquid such as a petroleum oil or a synthetic lubricant and prepare a concentrate containing 20–50% of copolymer. This concentrate is particularly convenient for adding to liquids which are to be treated with a copolymer.

If the copolymer is prepared in a volatile solvent it may be transferred to the oil or relatively non-volatile ester or the like by mixing the solution of copolymer and oil or ester and distilling off the volatile solvent. Such mixtures may be heated to 100–200° C. at reduced pressures to ensure complete removal of the volatile solvent. During the heating of the mixture, remaining traces of initiator are decomposed.

In the following examples, all parts are by weight unless otherwise indicated.

EXAMPLE 1, PART I (a) There were mixed 250 parts of lauryl methacrylate, 12.5 parts of toluene and one part of an alcohol-ketone solution of 50% of diisopropylbenzene hydroperoxide. Thirty percent of this mixture and 0.2 part of an n-butanol solution of 25% diisobutylphenoxyethoxyethyl benzyl dimethylammonium chloride were charged to a reaction vessel equipped with a stirrer, reflux condenser, inlet tube through which nitrogen gas flowed, and an oil bath. When this was heated to 105° C., polymerization occurred readily, and within five minutes an exotherm caused the batch temperature to rise to a maximum of 124° C.; thereupon, the remaining 183.7 parts of monomeric mixture were charged during 1.67 hours, maintaining a batch temperature of 112–118° C. At two hours, 47.5 parts were removed for copolymerization as described in the next section (b), also an aliquot of 5 parts was removed and analyzed for nonvolatile matter by heating weighed analytical samples of about 0.3 gram in a forced draft electric air oven for four hours at 150° C. Seventy and two-tenths percent nonvolatile matter was found representing a 71.1% polymerization yield. After 4 hours, the temperature of the remaining 204.7 parts was allowed to fall to 106° C., and the batch temperature was maintained between 103–106° C. until a total of 6.5 hours had elapsed. Increments of the 50% solution of diisopropylbenzene hydroperoxide, of a 5% butanol solution of diisobutylphenoxyethoxyethyl benzyl dimethyl ammonium chloride, and toluene were added as follows: at 2.42 hours, 0.17, 0.17, and 10 parts, respectively; at 4 hours, 0.25, 0.25, and 10 parts respectively; at 4.67 hours, 5.33 hours, and 6 hours, 0.17, 0.17, and 10 parts, each respectively. At 6.5 hours, the batch was allowed to cool and there resulted 243.4 parts of product which analyzed 69.7% polymer by nonvolatile matter representing an 84.2% polymerization yield. This polymer at 30% concentration in toluene had a viscosity of 66.3 centistokes at 100° F. The batch was split for copolymerization with various amounts of an alkoxypolyethylene glycol methacrylic ester as described in sections (c), (d), and (e).

(b) The 47.5 parts of toluene solution which had been removed from the polymerization after 2 hours and had analyzed 70.2% solids, as described in section (a), were charged to another reaction vessel and flushed with nitrogen. To this portion, with its temperature at 108° C., was charged during 0.25 hour a mixture composed of 5 parts of a methoxypolyethylene glycol methacrylate with an average molecular weight of 425, 3 parts of toluene, 0.025 part of a 50% solution of diisopropylbenzene hydroperoxide, and 0.025 part of n-butanol solution of 5% diisobutylphenoxyethoxyethyl benzyl dimethyl ammonium chloride. Copolymerization was allowed to continue maintaining a batch temperature of 113–115° C. At 4 hours, the batch temperature was allowed to fall so as to maintain a temperature of 104–107° C. for a total of 6.5 hours. Diisopropylbenzene hydroperoxide solution, 50% strength, was added as follows: at 2.93 hours, 0.04 part; at 4.0 hours, 0.06 part; at 4.67 hours, 5.33, and 6.0 hours, 0.04 part, each respectively. For each charge of hydroperoxide catalyst, a corresponding charge of butanol solution of 5 weight percent of diisobutylphenoxyethoxyethyl benzyl dimethyl ammonium chloride was made as follows: at 2.93 hours, 0.04 part; at 4 hours, 0.06 part; at 4.67, 5.33, and 6.0 hours, 0.04 part respectively. Additions of 2.5 parts of toluene were made with each catalyst-activator addition. At 6.5 hours, the heating was stopped and 50 parts of toluene were added. Agitation of the batch at 80–100° C. was continued for one hour and then at room temperature to ensure homogeneity. The resulting solution weighed 105.7 parts and analyzed 39.9% nonvolatile matter when analytical samples were heated in a forced draft oven for 4 hours at 150° C. This represents a copolymerization yield of 81.4%. When this copolymer was tested for dispersancy of asphaltenes by the standard asphaltenes test procedure, 1% of copolymer dispersed 0.4% asphaltenes readily. On the other hand, a copolymer made by mixing all monomers at the start and carrying polymerization under parallel conditions to a yield of over 80% gave a copolymer which failed in the standard test.

(c) In another polymerization vessel equipped as described in section (a) there was charged 64.5 parts of product obtained under (a) which analyzed 69.7% polymer. After flushing with nitrogen and heating to 112° C., there was added in 7 minutes a mixture consisting of 2.8 parts of methoxypolyethylene glycol methacrylate of average molecular weight 425, 2 parts of toluene, 0.014 part of 50% solution of diisopropylbenzene hydroperoxide, and 0.014 part of 5% solution of diisobutylphenoxyethoxyethyl benzyl dimethyl ammonium chloride. An oil bath was employed to maintain a batch temperature of 111–114° C. until a total of 11.42 hours had elapsed. At 9.17 hours, 0.044 part of 50% solution of diisobutylphenoxyethoxyethyl benzyl dimethyl ammonium chloride were charged to the polymerization vessel in 2.5 parts of toluene. At 11.42 hours, the batch was diluted with 25 parts of toluene. There resulted 84.6 parts of a clear low-viscosity polymeric solution which analyzed 49.3% copolymer. This toluene solution was used in making oil solutions. For example:

(1) Eleven and six-tenths parts of this 49.3% solution was mixed with 21.1 parts of a light hydraulic mineral oil, heated and stirred at 105–110° C./10 mm. for one hour to give 28.6 parts of oil solution. This is a useful concentrate for blending with hydraulic oils to provide efficient hydraulic fluids.

(2) A mixture of 11.1 parts of the 49.3% solution and 20.6 parts of tributyl phosphate was stirred and heated to 100–105° C./10 mm. for one hour to give a 20% solution of copolymer in the phosphate ester. This is a concentrate useful for preparing phosphate ester hydraulic fluids.

(3) Another mixture was made in which 10.3 parts of aforementioned toluene solution and 17.9 parts of di-2-ethylhexyl sebacate was stirred and heated as above to give 25.4 parts of a dispersant-type synthetic lubricant.

(4) Ten and three-tenths parts of toluene solution were mixed with 20 parts of kerosene, heated, and stirred at 90° C./10 mm. for one hour to give a 20% solution in a fuel oil. This is useful for blending with fuel oils to improve storage stability, dispersing any gums that form.

When a test oil blend was prepared from this copolymer, it was demonstrated that 0.5% of this copolymer dispersed 0.4% of asphaltenes in the standard asphaltene test.

(d) The above procedure was followed with the same materials except 65.2 parts of the solution of homopolymer containing 69.7% of polymer as described in section (a) was heated to 110° C. with an oil bath. There was charged in 10 minutes a mixture composed of 6 parts of a methoxypolyethylene glycol methacrylate average molecular weight 425, 4 parts of toluene, 0.03 part of diisopropylbenzene hydroperoxide in a 50% solution, and 0.03 part of a 5% solution of diisobutylphenoxyethoxyethyl benzyl dimethyl ammonium chloride. The batch temperature was held at 110–112° C. for 11.25 hours with an oil bath. At 9.0 hours, a solution of 50% diisopropylbenzene hydroperoxide, a 5% solution of diisobutylphenoxyethoxyethyl benzyl dimethyl ammonium chloride, and toluene were added as follows: 0.044 part, 0.044 part, and 2.5 parts respectively. The batch was diluted with 25 parts of toluene at 11.25 hours giving 88.7 parts of product which analyzed 49.1% copolymer.

Five-tenths percent of this copolymer dispersed 0.4% asphaltenes effectively by the standard test.

(e) Another copolymer was made under similar conditions using 18.1 parts of the 69.7% polymer described in section (a). To this portion at 6.5 hours and with its temperature at 110° C. was added in 0.25 hour the following mixture: 15 parts of methoxypolyethylene glycol methacrylic ester of average number molecular weight 425, 10 parts of toluene, 0.075 part of diisopropylbenzene hydroperoxide of 50% strength and 0.075 part of a 5% solution of diisobutylphenoxyethoxyethyl benzyl dimethyl ammonium chloride. With the batch temperature maintained at 109–113° C. for 11.17 hours, the copolymerization was allowed to continue under a nitrogen atmosphere. Additional catalyst, activator and solvent were charged at 8.92 hours consisting of 0.024 part each of 50% solution of diisopropylbenzene hydroperoxide solution and 5% solution of diisobutylphenoxyethoxyethyl benzyl dimethyl ammonium chloride, and 1.5 parts of toluene, respectively. At 11.17 hours, dilution with 25 parts of toluene yielded a hazy, viscous solution which on analysis showed a content of 30.4% of copolymer.

This copolymer was easily transferred to a mineral oil by mixing 45.3 parts of the 30.4% solution with 40 parts of 100 SUS neutral oil and then heating and stirring to 100° C./10 mm. during one hour. An oil solution of 0.5% copolymer effectively dispersed 0.4% asphaltenes in a test blend by the standard test.

EXAMPLE 1, PART II

To make a copolymer by the normal copolymerization process, an identical polymerization vessel was used as described in Example 1, Part I. A monomeric mixture was made up using Lauryl methacrylate, 46.6 parts
Methoxypolyethylene glycol methacrylate of average molecular weight 425, 5 parts
Toluene, 7.5 parts
Diisopropyl benzene hydroperoxide, 50% solution, 0.2 part Seventeen and seven tenths parts of this mixture and 0.04 part of n-butanol solution of 25% diisobutylphenoxyethoxyethyl benzyl dimethyl ammonium chloride were charged to the polymerization vessel which was swept with nitrogen and heated with an oil bath at 123–125° C. to provide a batch temperature of 111–115° C. As soon as copolymerization had started, the rest of the monomeric mixture was charged during 1.75 hours. Additions of hydroperoxide were made as follows: at 2.4 hours, 0.04 part; at 4 hours, 0.06 part; and at 4.67, 5.33, and 6.0 hours, 0.04 part, respectively. Immediately following the addition of the hydroperoxide, an n-butanol solution of 5% diisobutylphenoxyethoxyethyl benzyl dimethyl ammonium chloride was added as follows: at 2.4 hours, 0.04 part; at 4 hours, 0.06 part; and at 4.67, 5.33, and 6.0 hours, 0.04 part, respectively. Two and five tenths parts of toluene were added with each of the hydroperoxide additions. After 4 hours, the temperature of the heating bath was lowered to 111° C. to maintain a batch temperature of 104–102° C. for the rest of the copolymerization cycle. At 6.3 hours, 43.5 parts of toluene were added; the batch was stirred and allowed to cool to room temperature during an hour. The product was 108.1 parts of slightly hazy viscous solution of copolymer. Analysis on heating weighed analytical samples for 4 hours at 150° C., as indicated in Part I of Example 1, showed 38.4% of copolymer.

An oil solution was made by mixing 83.6 parts of this 38.4% solution with 65 parts of light lubricating oil, and heating and stirring at 105–110° C./10 mm. for 90 minutes. Where test blends were made up, it was found that even as much as 2% of this copolymer failed to disperse 0.4% asphaltenes by the standard asphaltenes test.

EXAMPLE 2

A mixture was prepared from the following:

Cetyl-stearyl methacrylate, 15.3 parts
Lauryl-myristyl methacrylate, 21.7 parts
n-Butyl methacrylate, 6.1 parts
Toluene, 2.5 parts
Diisopropylbenzene hydroperoxide in a 50% solution as furnished commercially, 0.1 part An initial charge of 13.7 parts of this mixture and 0.04 part of n-butanol solution containing 0.01 part of diisobutylphenoxyethoxyethyl benzyl dimethyl ammonium chloride were fed into a reaction vessel which was heated at 125° C. and swept with nitrogen. After copolymerization had started, the rest of the above mixture was charged during 100 minutes, bringing the elapsed time to 1.8 hours. At 2 hours, an aliquot showed 74% of copolymer. Then, during 0.25 hour, while maintaining a batch temperature of 117–118° C., the following mixture of the following materials was charged:

Methoxypolyethylene glycol methacrylate of average number molecular weight 425, 7.5 parts (this methacrylic ester was made from the commercial alkoxypolyethylene glycol, known as "Carbowax 350"). The average number molecular weight of the methacrylate is calculated from an average number molecular weight determined by a hydroxyl number found on the methoxypolyethylene glycol. Analytical data for the methacrylic ester were: Saponification number—found, 127.6; calcd., 132; $n_D^{20}$, 1.4590.
Diisopropylbenzene hydroperoxide, 50% solution, 0.04 part.
Diisobutylphenoxyethoxyethyl benzyl dimethyl ammonium chloride (5% in n-butanol), 0.002 part.

The batch was stirred and heated at 117–118° C.; a 50% solution of diisopropylbenzene hydroperoxide was added as follows: at 2.92 hours, 0.04 part; at 4.00 hours, 0.06 part; at 4.67 hours, 0.04 part; at 5.33 hours, 0.04 part, and at 6.00 hours, 0.04 part. At the same time, diisobutylphenoxyethoxyethyl benzyl dimethyl ammonium chloride was added in an amount equal to one-tenth that of the 100 percent diisopropylbenzene hydroperoxide; also, 2.5 parts of toluene were added each time hydroperoxide was added. The batch temperature was kept at 105–117° C. the first 4.0 hours; thereafter, at 103–105° C. for the duration of the heating cycle. At 6.5 hours, the batch was diluted with 50 cc. of toluene and stirred 0.5 hour to produce a homogeneous solution that was allowed to cool to 30° C. The weight of clear solution was 107.1 parts. Analysis of this solution showed 38.5% of copolymer.

This copolymer was easily transferred to a mineral oil by mixing a given portion of 100 SUS neutral oil and then heating and stirring at 105° C./10 mm. during 90 minutes. Twenty-five hundredth percent of this copolymer dispersed 0.4% of asphaltenes effectively using the standard test at 150° C.

In the case where a copolymer was made with an identical percentage of methoxypolyethylene glycol methacrylate except that the normal or conventional method of making copolymers was used, there resulted a copolymer which did not disperse 0.4% of asphaltenes in mineral oil, even when as much as 2% of the copolymer was used.

EXAMPLE 3

A monomeric mixture I was prepared by mixing together the following:

Lauryl-myristyl methacrylate, 31.1 parts, 96.5% purity by saponification number.
Toluene, 2.5 parts.
Diisopropylbenzene hydroperoxide, 0.2 part of 50% solution as furnished commercially.

Ten and one-tenth parts of mixture I was fed into a reaction vessel with 0.04 part of a butanol solution of 25% diisobutylphhenoxyethoxyethyl benzyl dimethyl ammonium chloride. As soon as polymerization had started, the rest of mixture I was charged to the reaction vessel during 45 minutes, maintaining a batch temperature of 105–115° C. Fifteen minutes later, the reaction mixture showed by analysis a solids content of 59.3% corresponding to a polymer yield of 67%. At 2 hours, the addition of mixture II was started. Mixture II consisted of:

Methoxypolyethylene glycol methacrylate of average molecular weight 425, 20 parts.
Toluene, 5 parts.
Diisopropylbenzene hydroperoxide, 50% solution, 0.2 part and the above-mentioned quaternary ammonium chloride, 0.01 part in 0.2 part of n-butanol.

Addition of this mixture was completed in 15 minutes. The reaction mixture was kept at 105–116° C. for the first 4 hours, thereafter at 104–105° C. Additions of small portions of the initiator, the 50% solution of diisopropylbenzene hydroperoxide, the 5% solution of diisobutylphenoxy ethoxyethyl benzyl dimethyl ammonium chloride in butanol, and toluene, were made at 2.83, 4, 4.67, 5.33, and 6 hours and totaled 0.22 part, 0.22 part and 12.5 parts, respectively. Heating was discontinued at 6.8 hours; toluene in an amount of 43.5 parts was then added, and stirring was continued until the product had cooled below 35° C. The product was a 30.7% solution of copolymer in toluene.

A mixture of 63.6 parts of the 30.7% solution and 40 parts of 100 SUS neutral oil was stirred and heated to 109° C./10–15 mm. for 90 minutes to give a 28.5% solution of copolymer in oil. A minimum of 0.125% copolymer effectively dispersed 0.4% of asphaltenes in a blend by the standard test.

A copolymer made from monomers by the conventional copolymerization process wherein the ratio of lauryl-myristyl methacrylae to methoxypolyethylene glycol methacrylate of average molecular weight 425 was identical; i.e., 60:40 weight percent exhibited insolubility in a 100 SUS neutral oil at 35% solids concentration and was unsuitable for making a blend for use as a lubricating oil.

Another copolymer made from monomers by the conventional copolymerization process wherein the ratio of lauryl-myristyl methacrylate to methoxypolyethylene glycol methacrylate of average molecular weight of 425 was 70:30 produced a clear oil solution at 33% of solids concentration, but gave no dispersancy by the standard asphaltenes test.

EXAMPLE 4

By a procedure similar to that for the preceding example, lauryl-myristyl methacrylate amounting to 7.5 parts, 99.8% pure, was mixed with 1.25 parts of toluene and 0.1 part of diisopropylbenzene hydroperoxide, 50% solution, and allowed to copolymerize in the presence of 0.005 part of 100% dodecyldimethyl benzyl ammonium chloride. When about an 80% yield of lauryl-myristyl polymethacrylate had been obtained, an addition of the following materials was made during 15 minutes with the batch temperature at 110° C.:

Methoxypolyethylene glycol methacrylate of average molecular weight 425, 17.5 parts.
Toluene, 10 parts.
Diisopropylbenzene hydroperoxide, 50% solution, 0.09 part.
Dodecyldimethyl benzyl ammonium chloride, 5% solution in n-butanol, 0.09 part.

Additions of diisopropylbenzene hydroperoxide, 50% solution, were made at 4.0 hours in an amount of 0.03 part, and at 2.67, 4.67, 5.3, and 6 hours in amounts of 0.02 part, respectively. Additions of butanol solution of 5% of the quaternary ammonium chloride were also made at 4 hours in an amount of 0.03 part and at 2.67, 4.67, 5.3, and 6 hours in amounts of 0.02 part, respectively. Portions of toluene added during the course of the copolymerization amounted to 140 parts. At 6.25 hours, 20 parts of toluene were added and the batch stirred one hour as it cooled to room temperature. A slightly hazy, very viscous solution was obtained which analyzed 30% copolymer.

A portion (29.3 parts) of the 30% solution was mixed with 20 parts of light lubricating oil and stirred and heated under reduced pressure to 110° C./10 mm. to give a hazy oil solution of the copolymer. This copolymer displayed excellent dispersancy of asphaltenes. Only 1% of it was required to disperse 0.4% of asphaltenes in a mineral oil by the standard test. A corresponding copolymer made by conventional copolymerization procedure failed to disperse the asphaltenes under like conditions at 2%.

EXAMPLE 5

A reaction vessel was fitted with a reflux condenser, stirrer, inlet tube for nitrogen gas, and oil bath. During the first 1.75 hours, there was charged thereto a mixture composed of 42.8 parts of lauryl-myristyl methacrylate, 2.5 parts of toluene, and 0.1 part of benzoyl peroxide. The temperature of the reaction vessel was kept at 121–122° C. the first 4 hours, thereafter for the duration of the polymerization cycle at 111°–113° C. to maintain batch temperature of 114–117° C. and 104–105° C., respectively. Fifteen minutes after this mixture had been charged, an aliquot was removed, treated with hydroquinone, and analyzed by heating in a forced draft oven at 150° C. for 4 hours. The analytical data showed the polymerization to be 78% complete. Thereafter, over the next 15 minutes, there was charged thereto a mixture composed of 7.5 parts of methoxypolyethylene glycol methacrylate of average number molecular weight 425, 5 parts of toluene, and 0.02 part of benzoyl peroxide. Additions of benzoyl peroxide in 2.5 parts of toluene were made as follows: at 2.92 hours, 0.02 part; at 4 hours, 0.03 part; and at 4.67, 5.3, and 6 hours, 0.02 part, respectively. At 6.5 hours, 43.5 parts of toluene was charged and the batch allowed to cool to 30° C. with stirring. There resulted 115.6 parts of product which analyzed 33.8% copolymer.

When an oil blend was prepared from this copolymer, it was demonstrated that 0.125% of this copolymer dispersed 0.4% of asphaltenes. This is a most significant improvement over a copolymer made by the conventional polymerization process where two percent of copolymer failed to disperse 0.4% of asphaltenes.

EXAMPLE 6

The apparatus described above was used in preparing a copolymer of lauryl acrylate with an alkoxypolyethylene glycol methacrylate employing the delayed addition polymerization process. A monomeric mixture I, composed of 40 parts of lauryl acrylate, 2.5 parts of toluene, and 0.2 part of diisopropylbenzene hydroperoxide solution, 50% pure hydroperoxide, was charged to the polymerization vessel during 1.75 hours with 0.04 part of n-hexanol solution containing 0.01 part of diisobutylphenoxyethoxyethyl benzyl dimethyl ammonium chloride added initially. After 2 hours, an aliquot of about 0.3 g. was analyzed by heating for 4 hours at 150° C. in a forced draft oven to show nonvolatile matter representing an 82% yield of polyacrylate. During the interval, 2 to 2.25 hours, a monomeric mixture II was charged consisting of: 10 parts of ethoxypolyethylene glycol methacrylate of average molecular weight 437, 5 parts of toluene, and 0.05 part of diisopropylbenzene hydroperoxide, 50% solution. Concomitantly, there was added to the polymerizing material 0.05 part of 5% solution of diisobutylphenoxyethoxyethyl benzyl dimethyl ammonium chloride. The polymerizing material was maintained at 105–110° C. for the first two hours, thereafter at 103–105° C. for the duration of the polymerization cycle. Portions of diisopropylbenzene hydroperoxide 50% solution, toluene, and quaternary ammonium chloride, 5% solution, added during the course of the copolymerization then totaled 0.22, 26.1, and 0.22 parts respectively. At 6.5 hours, the batch was diluted with 50 parts of toluene, stirred 0.75 hour, and allowed to cool. There resulted 111.1 parts of very viscous solution of copolymer. Analysis showed 36.3% solids.

Seventy-six and two-tenths parts of this 36.3% solution was mixed with 57.5 parts of lubricating oil, heated and stirred at 105–110° C./10 mm. for 90 minutes to give 85.4 parts of oil solution.

When 1% of this copolymer was used in an oil test blend with the special asphaltenes test, 0.4% of asphaltenes was dispersed most effectively. A corresponding copolymer made by the normal polymerization process required over 2% of copolymer to disperse the same quantity of asphaltenes.

EXAMPLE 7

Using the apparatus described in previous examples, a copolymer of lauryl-myristyl methacrylate with di-(lauryl-myristyl)fumarate was first prepared by feeding the following mixture into the polymerization vessel heated at 124–127° C. during 1.75 hours:

Lauryl-myristyl methacrylate, 4 parts.
Di(lauryl-myristyl)fumarate, 16 parts.
Toluene, 2.5 parts.
Diisopropylbenzene hydroperoxide, 50% solution, 0.1 part.

A quantity (0.005 part) of diisobutylphenoxyethoxyethyl benzyl dimethyl ammonium chloride had been charged to the reaction vessel in the beginning. Additional diisopropylbenzene hydroperoxide, 50% solution, toluene, and quaternary ammonium chloride, 5% solution, added at 2.4, 4, and 4.67 hours totaled 0.07, 4.5, and 0.07 part, respectively. At 5 hours, when the copolymer yield was 50%, an addition of the following mixture was then made over 10 minutes as soon as the batch temperature had reached 103° C.:

Methoxypolyethylene glycol methacrylate, average molecular weight of 425, 5 parts.
Toluene, 3 parts.
Quaternary ammonium chloride, 5% solution in n-butanol, 0.03 part.
Diisopropylbenzene hydroperoxide, 50% solution, 0.03 part.

Heating at 103° C. was continued for the duration of the copolymerization cycle. At 6 hours, 0.02 part of diisopropylbenzene hydroperoxide, 50% solution, 1.5 parts of toluene, and 0.02 part of diisobutylphenoxyethoxyethyl benzyl dimethyl ammonium chloride, 5% solution in n-butanol, were added. At 22 hours, 30 parts of toluene were added, and heating was stopped. There resulted a toluene solution of copolymer which analyzed 31.8% copolymer. At 30% concentration, 100° F., its viscosity was 5.5 centistokes.

Twenty-five parts of the 31.8% solution was mixed with 15 parts of lubricating oil, stirred and heated at 105° C./10 mm. for 90 minutes to yield a hazy oil solution, 39.8% of copolymer.

A 1% oil solution of this copolymer exhibited acceptable clarity.

Applicattion of the standard asphaltenes test showed 1% of this copolymer to disperse 0.4% of asphaltenes; this is a marked improvement over the performance of a copolymer made by the usual copolymerization technique from the same proportion of the same starting materials.

EXAMPLE 8

In exactly the same manner as described for di(lauryl-myristyl)fumarate copolymers above, a copolymer was prepared first from:

Di-cetyl-stearyl itaconate, 16 parts.
Lauryl-myristyl methacrylate, 4 parts.
Toluene, 2.5 parts.
Diisopropylbenzene hydroperoxide, 50% solution, 0.1 part.
Quaternary ammonium chloride, 5% solution, 0.1 part.

The delayed addition at 5 hours when the batch temperature was 104° C. consisted of:

Methoxypolyethylene glycol methacrylate of average molecular weight 425, 5 parts.
Toluene, 5 parts.
Hydroperoxide catalyst, 50% solution, 0.03 part.
Quaternary ammonium chloride activator. 5% solution, 0.03 part.

At 22 hours, dilution of the batch was made and there resulted a slightly hazy low-viscosity solution which analyzed 28.0% of copolymer. At 25% copolymer concentration, a toluene solution at 100° F. showed a viscosity of 9.4 centistokes.

The copolymer was transferred to a petroleum lube oil by heating a portion of the toluene solution with the oil under reduced pressure. A 30% concentrate was thus prepared with the final heating at 105° C./10 mm.

Application of the standard asphaltenes test to this copolymer showed that 1% of this copolymer dispersed 0.4% of asphaltenes. When a comparable copolymer was made by the normal copolymerization process, a large quantity of sediment was present under identical test conditions and the asphaltenes test showed this copolymers to fail as a dispersant.

EXAMPLE 9

By the same delayed addition process as described in the previous examples, a copolymer of a lauryl methacrylate and methoxyethoxyethyl methacrylate, 50:50 weight percent, was prepared.

Monomeric mixture I was prepared and consisted of:

Lauryl methacrylate, 25 parts.
Toluene, 2.5 parts.
Diisopropylbenzene hydroperoxide, 50% solution, 0.2 part.
Diisobutylphenoxyethoxyethyl benzyl dimethyl ammonium chloride, 25% solution in n-hexanol, 0.04 part.

During two hours, the lauryl methacrylate was polymerized to the extent of 72%. Then, during 0.25 hour, monomeric mixture II was charged and consisted of:

Methoxyethoxyethyl methacrylate, 25 parts.
Diisopropylbenzene hydroperoxide, 50% solution, 0.13 part.

Also 0.12 part of a 5% solution of diisobutylphenoxyethoxyethyl benzyl dimethyl ammonium chloride was added simultaneously. The batch temperature for the first 4 hours was 104–107° C.; thereafter remained at about 102° C. The high viscosity encountered at 2.75 hours and 4.25 hours required dilution with 10 parts of toluene each time; the total toluene, hydroperoxide catalyst (50% solution) and activator (5%) solution added during the course of the copolymerization amounted to 32.5, 0.22, and 0.22 parts, respectively. At 6.5 hours, the batch was diluted with 50 parts of toluene. At 6.75 hours, heating and stirring was discontinued. There resulted 121.7 parts of slightly hazy and very viscous solution which analyzed 33.9% of copolymer.

Forty-five and seven-tenths parts of the 33.9% solution was mixed with 25 parts of lube oil and stirred and heated, finally for 90 minutes at 105° C./10 mm. to give 44.7 parts of concentrated solution of copolymer.

Only 1% of this copolymer was required to disperse 0.4% of asphaltenes by the standard asphaltenes test.

When identical materials were used to make a 50:50 copolymer by the conventional copolymerization technique, a gelled mass in toluene resulted that was oil-insoluble. Since it was not soluble, it could not be used as an oil soluble dispersant whether in lube oil, fuel oil, hydraulic fluids, or synthetic lubricants. This also demonstrates that the new polymerization process of this invention provides a way of introducing more of the desirable active "ingredient" into the final copolymer.

Copolymers of lauryl methacrylate with about 20 weight percent of methoxyethoxyethyl methacrylate prepared by the delayed addition process were also very effective dispersants, only 0.5% copolymer being required to disperse 0.4% of asphaltenes by the standard test.

EXAMPLE 10

A mixture was prepared from 9.1 parts of lauryl methacrylate, 0.75 part of toluene, and 0.06 part of diisopropylbenzene hydroperoxide, 50% solution. Two and nine tenths parts of this mixture was run into a reaction vessel heated to 122° C. and flushed with nitrogen. Six hundredths part of n-hexanol solution of 5% diisobutylphenoxyethoxyethyl benzyl dimethyl ammonium chloride was added to activate the polymerization, and as soon as the exotherm had subsided (10 minutes), the rest of the mixture was charged for a total of 1.8 hours. Portions of diisopropylbenzene hydroperoxide, 50% strength, toluene, and diisobutylphenoxyethoxyethyl benzyl dimethyl ammonium chloride were added during the course of this homopolymerization during the next 4 hours and totaled 0.066, 3.8, and 0.066 parts, respectively. Then, at 6.5 hours, there was added gradually during 5 minutes the following monomeric mixture:

Methoxyisopropoxyisopropyl methacrylate, 6 parts.
Diisopropylbenzene hydroperoxide, 50% solution, 0.03 part.
Diisobutylphenoxyethoxyethyl benzl dimethyl ammonium chloride, 5% in n-hexanol, 0.03 part.
Toluene, 2 parts.

Heating at 100° C. and stirring were continued. At 23 hours, 25 cc. of toluene was charged and after 30 minutes, the batch was allowed to cool to room temperature. A clear, viscous toluene solution of copolymer was obtained; it analyzed 30.5% copolymer. At 30% concentration of copolymer and 100° F., a toluene solution showed a viscosity of 1047 centistokes.

An oil solution of this copolymer was prepared by adding 10 parts of lube oil to 14.1 parts of the toluene solution, 30.1% of copolymer. Volatile matter was stripped off on stirring and heating at 105° C./10 mm. for 90 minutes. The oil solution was 28.6% copolymer.

Two percent of this copolymer dispersed 0.4% of asphaltenes by the standard asphaltenes test.

However, when a copolymer was made from identical percentages of the above monomers using the normal copolymerization technique (conventional copolymerization process), 2% of copolymer failed to disperse 0.4% of asphaltenes by the standard asphaltenes test.

EXAMPLE 11

Methoxypolyethylene glycol having an average molecular weight of 750 was used to make a methacrylic ester. The molecular weight of this methacrylate was 818, based on the hydroxyl number of the methoxypolyethylene glycol.

As in previous examples, two monomeric mixtures were prepared. Monomeric mixture I consisted of:

Lauryl methacrylate, 40.1 parts.
White mineral oil, 2.5 parts.
Diisopropylbenzene hydroperoxide, 50% solution, 0.2 part.

Fifteen parts of this mixture I with 0.04 part of a 25% n-hexanol solution of diisobutylcresoxyethoxyethyl dimethyl benzyl ammonium chloride was put into the reaction vessel heated at 120–125° C. and swept with nitrogen. As soon as polymerization started, the rest of mixture I was charged over a total of 1.8 hours. Analysis of an aliquot of the reaction mixture at 2 hours showed a 72% yield of lauryl polymethacrylate. Thereupon, the addition of the mixture II was started, which consisted of:

Methoxypolyethylene glycol methacrylate of average molecular weight 818, 10.0 parts.

Diisopropylbenzene hydroperoxide, 50% solution, 0.05 part.

White mineral oil, 5.0 parts.

This was added during 10 minutes with the simultaneous addition of diisobutylcresoxyethoxyethyl dimethyl benzyl ammonium chloride. The batch temperature was kept at 105–117° C. the first four hours. Thereafter, it was kept at 104–106° C. for the duration of the copolymerization. Portions of diisopropylbenzene hydroperoxide, 50% strength, light mineral oil, and diisobutylcresoxyethoxyethyl dimethyl benzyl ammonium chloride, 5% in n-hexanol totaling 0.22, 12.5, and 0.22 parts, respectively, were added during the course of the copolymerization.

At 6.5 hours, the batch was diluted with 43.5 parts of light lubricating oil and stirred 45 minutes with heating to drive off volatile matter and to produce a hazy, viscous solution which weighed 100.7 parts. Analysis showed the solution to contain 43.1% of copolymer. This copolymer was a good dispersant, 2% of copolymer dispersing 0.4% of asphaltenes.

When this example was repeated, except that the initial stage involving mixture I was allowed to polymerize 6.5 hours before mixture II was added, a product was obtained which showed excellent dispersancy by the standard asphaltenes test, 0.5% of copolymer dispersing 0.4% of asphaltenes.

The above procedure is repeated with substitution of toluene for oil and with a starting mixture of 38.5 parts of lauryl methacrylate and 1.5 parts of methacrylic acid. The final copolymer solution is diluted with toluene to a copolymer content of 30%. This solution has a viscosity of about 2000 cs. at 100° F. Use of 1% of this copolymer disperses 0.4% of asphaltenes in the asphaltenes dispersancy test.

This procedure is applied to a starting mixture of 38.5 parts of lauryl methacrylate and 1.5 parts of maleic anhydride in toluene. A 30% solution of the final copolymer in toluene has a viscosity of 210 cs. at 100° F. This copolymer at 1% also disperses 0.4% of asphaltenes.

This procedure is again followed with 38.5 parts of lauryl methacrylate and 1.5 parts of itaconic acid, the latter being introduced in 10 parts of n-butanol. The final solution adjusted with toluene to a 30% copolymer content has a viscosity of 110 cs. at 100° F. A solution of 1% of copolymer disperses 0.4% of asphaltenes in oil.

This procedure is repeated with 1.5 parts of the half-acid N-n-butylmaleamide. The resulting copolymer imparts to a 30% solution in toluene a viscosity of 380 cs. at 100° F. Likewise 1% of this copolymer disperses 0.4% of asphaltenes in the standard test.

EXAMPLE 12

A mixture of 46.1 parts of lauryl methacrylate, 2.5 parts of toluene, and 0.2 part of diisopropylbenzene hydroperoxide, 50% strength, was slowly run into a reaction vessel heated at 121–124° C. under a nitrogen atmosphere. With the initial addition there was fed 0.04 part of a 25% solution of diisobutylphenoxyethoxyethyl benzyl dimethyl ammonium chloride. This operation required 1.8 hours. An aliquot was taken at 2 hours and analyzed to show 58% conversion to polymer. Another mixture composed of the following materials was charged to the reaction mixture during the interval of 0.25 hour:

Methoxypolyethylene glycol methacrylate of average molecular weight 425, 2.0 parts.
N-vinyl-2-pyrrolidinone, 2.0 parts.
Diisobutylphenoxyethoxyethyl benzyl dimethyl ammonium chloride, 5% solution in n-hexanol, 0.02 part.
Diisopropylbenzene hydroperoxide, 50% solution, 0.02 part.

The heating for the first 4 hours was kept at 108–114° C., thereafter at 104–105° C. for the duration of the copolymerization. Small increments of catalyst, toluene, and activator were added during the course of the copolymerization and totaled 0.22 part of diisopropylbenzene hydroperoxide, 50% solution, 15 parts of toluene, and 0.22 part of quarternary ammonium chloride, 5% in n-hexanol. At 6.5 hours, 50 cc. of toluene was charged; heating and stirring was continued 0.75 hour to effect a homogeneous product which was cooled to room temperature. The resulting product weighed 103.6 parts. Analysis showed 41.5% solids representing an 86% copolymer yield. A toluene solution, 30% of the copolymer, 100° F., showed a viscosity of 184.3 centistokes.

An oil solution was prepared by mixing a portion of the 41.5% toluene solution with a light mineral oil, then stirring and heating under reduced pressure to 105° C./10 mm. When a test blend was made up and subjected to the standard asphaltenes test, it was found that 1% of this copolymer dispersed 0.4% of asphaltenes in a mineral oil most effectively.

A corresponding copolymer made by the normal copolymerization process failed to dispense 0.4% of asphaltenes in mineral oil at double percentage of copolymer used above.

EXAMPLE 13

In a similar manner, a mixture was prepared from 40.5 parts of lauryl methacrylate, 2.5 parts of toluene and 0.08 part of azodiisobutyronitrile. Thirteen parts of this mixture were charged to a reaction vessel flushed with nitrogen and heated at 120° C. The temperature of the reaction vessel was held at 105–113° C. for 4 hours and then continued at 104–106° C. for a total of 6.5 hours. The rest of the monomeric mixture was charged to the reaction vessel during 1.67 hours. Then, during the interval of 2 to 2.25 hours, the following mixture was added to the homopolymer catalyzed by azodiisobutyronitrile; 10 parts of methoxypolyethylene glycol methacrylate, 7.5 parts of toluene, 0.05 part of a 50% solution of diisopropylbenzene hydroperoxide, and 0.05 part of a 5% solution of diisobutylphenoxyethoxyethyl benzyl dimethyl ammonium chloride. Increments of 50% solution of diisopropylbenzene, of 5% butanol solution of diisobutylphenoxyethoxyethyl benzyl dimethyl ammonium chloride, and toluene were added as follows: at 2.92 hours, 0.04, 0.04, and 2.5 parts, respectively; at 4 hours, 0.06, 0.06, and 2.5 parts, respectively; at 4.67 hours, 5.33 hours, and 6 hours, 0.04, 0.04 and 2.5 parts, each respectively. At 6.5 hours, 50 parts of toluene were added and the batch allowed to cool. The product was a slightly hazy toluene solution which weighed 101.3 parts. A test oil blend of this copolymer showed that 0.5% of this copolymer effectively dispersed 0.4% asphaltenes in the standard test at 150° C.

The above methoxypolyethylene glycol methacrylate had an average molecular weight of 425.

EXAMPLE 14

Two moles of a commercial mixture composed of 4% of n-decanol, 66.4% of n-dodecanol, 27.2% of n-tetradecanol, and 2.4% of hexadecanol is treated with one mole of fumaric acid to produce the diester, essentially dilauryl-myristyl fumarate. A mixture is made from 34.4 parts of the dilauryl-myristyl fumarate, 12.5 parts of vinyl acetate, 12.5 parts of toluene, and 1.3 parts of benzoyl peroxide and is gradually fed into a polymerization vessel similar to that described in Example 1, wherein a nitrogen atmosphere was employed, and which is heated by an oil bath at 107° C. After 0.4 hour, 12.5 parts of additional toluene is charged. The addition of all of the mixture to the polymerization vessel requires 1.8 hours. After 1.9 hours, the addition of a second mixture composed of the following materials is made over 0.25 hour:

8.4 parts of methoxypolyethylene glycol methacrylate of average molecular weight 425, 0.04 part of diisopropylbenzene hydroperoxide solution of 50% strength, 0.01 part of diisobutylphenoxyethoxyethyl benzyl dimethyl ammonium chloride in a 25% solution of n-butanol, and 0.4 part of toluene.

At 2.67 hours, 2.4 parts of a 50% solution of diisopropylbenzene hydroperoxide is added together with 3 parts of toluene. At 4, 4.67, 5.3, and 6 hours respectively, there is added 0.38 part of a 50% solution of diisopropylbenzene hydroperoxide in three parts of toluene. Concomitantly, small increments of a 25% solution of diisobutylphenoxyethoxyethyl benzyl dimethyl ammonium chloride solution are added so that the five additions total 0.8 part of 25% solution. At 6.5 hours, 10 parts of toluene are added. The batch is allowed to cool with stirring. The product weighs 108 parts and contains by analysis 44.1% of copolymer. The copolymer is transferred to a mineral oil by heating 75 parts of the toluene solution in 35 parts of mineral oil for 90 minutes at 105° C./10 mm. to give a concentrate containing 48.6% of copolymer.

A test blend shows that 1% of this copolymer disperses 0.4% of asphaltenes using the standard test. A corresponding copolymer made by the normal polymerization process wherein all the monomers are present in the starting mixture is used in a similar test blend but fails at 1% of this copolymer to disperse the 0.4% of asphaltenes under the same conditions.

EXAMPLE 15

A monomeric mixture is made from the following materials:

4.5 parts of vinyl stearate,
4.5 parts of vinyl butyrate,
0.5 part of toluene, and
0.03 part of a 50.5% solution of diisopropylbenzene hydroperoxide.

A portion of 2.86 parts of this mixture is mixed with 0.03 part of 5% n-butanol solution of diisobutylphenoxyethoxyethyl benzyl dimethyl ammonium chloride and charged to a polymerization vessel swept with nitrogen and heated by an oil bath at 120° C. After 20 minutes, the rest of this mixture is charged during 100 minutes. Analysis then shows the copolymerization to be 42% complete. Then, there is added to the batch during 0.25 hour one part of methoxypolyethylene glycol methacrylate of average molecular weight 425. The batch temperature is kept at 115° C. for the first 4 hours and thereafter at 103° C. for the duration of the heating cycle. Beginning at 2.67 hours and through 6.7 hours, increments of a 50.5% solution of diisopropylbenzene hydroperoxide, of a 5% n-butanol solution of diisobutylphenoxyethoxyethylbenzyl dimethyl ammonium chloride, and of toluene are supplied to a total of 0.51, 0.35 and 2.5 parts respectively. At 8 hours, the batch is diluted with 9.1 parts of toluene, heating is stopped, and the batch is allowed to cool to room temperature. The batch amounts to 20 parts and contains by analysis 41.3% of copolymer. The viscosity of a toluene solution containing 30% of this copolymer is 25 centistokes at 100° F.

A concentrate of this copolymer is prepared by mixing 9.7 parts of the 41.3% copolymer solution with 9.7 parts of lubricating oil and heating to 105° C. with stirring and reduction of pressure to 10 mm. Hg for 90 minutes. The resulting oil solution contains 28.3% of copolymer.

Two percent of this copolymer dispersed 0.4% of asphaltenes in a test blend by the standard asphaltenes test. Two percent of a copolymer made by the conventional copolymerization process of oils failed to disperse 0.4% asphaltenes under similar test conditions.

EXAMPLE 16

A monomeric mixture is prepared by mixing 70.7 parts of n-butyl methacrylate, 12.5 parts of white mineral oil, 80.7 parts of stearyl methacrylate, 62.5 parts of lauryl methacrylate, and one part of a 50% solution of diisopropylbenzene hydroperoxide. Then 30% of this mixture and 0.2 part of a 25% hexanol solution of diisobutylphenoxyethoxyethyl benzyl dimethyl ammonium chloride are charged to a reaction vessel equipped with a stirrer, reflux condenser, inlet tube through which nitrogen gas flows, and an oil bath. The above mixture is heated to 105° C. and five minutes are allowed for the initial exothermic reaction. Thereupon, the remaining 70% of the monomeric mixture is charged to the polymerization vessel for a total of 1.75 hours with a batch temperature of 114–117° C. At four hours, the temperature of the batch is allowed to fall to 104–105° C., at which level it is maintained for a total of 6.33 hours. At 2 hours, another monomeric mixture consisting of 37.5 parts of methoxypolyethylene glycol methacrylate with average molecular weight of 428, 30 parts of white mineral oil, 0.188 part of a 50% solution of diisopropylbenzene hydroperoxide, and 0.038 part of a 25% hexanol solution of diisobutylphenoxyethoxyethyl benzyl dimethyl ammonium chloride are charged to the polymerization vessel over a quarter hour. Diisopropylbenzene hydroperoxide, 50% solution, is added in amounts of 0.2, 0.3, 0.3, 0.3, and 0.3 part at 2.92, 4, 4.67, 5.33, and 6 hours, respectively. A hexanol solution of 25% of diisobutylphenoxyethoxyethyl benzyl dimethyl ammonium chloride is added in amounts of 0.04, 0.06, 0.06, 0.06, and 0.06 part at 2.92, 4, 4.67, 5.33, and 6 hours, respectively. Additions of a white mineral oil are made at 2.92 and 4 hours in the amount of 12.5 parts each. Additions of 12.5 parts each of 100 SUS viscosity neutral oil are made at 4.67, 5.33, and 6 hours. At 6.33 hours, 250 parts of neutral oil is charged and the batch is heated and maintained at 100–108° C. under reduced pressure of 10 mm. for one hour to remove volatile matter, yielding 609 parts of oil solution. Eleven parts of additional neutral oil is added and the batch is agitated at 100–105° C. for about one hour to ensure homogeneity. This oil solution contains 29.8% of copolymer as analyzed by the precipitation method. At 210° F., this solution has a viscosity of 762 centistokes. Only 0.5% of this copolymer is required to disperse 0.4% of asphaltenes in the standard dispersancy test. Lubricating oil blends are made from this copolymer, using a base oil with a viscosity index of 97 and an ASTM pour point of 0° F. One percent of this copolymer in this oil gives viscosities of 52.88 cs. at 100° F. and 7.89 cs. at 210° F. Further, this blend has an ASTM pour point of −40° F. A 2% solution of this copolymer in the base oil has viscosities of 63.48 cs. at 100° F.; 9.96 cs. at 210° F., the viscosity index being 135. The ASTM pour point is −40° F.

EXAMPLE 17

The procedure of the above example is used with a starting mixture of 46.1 parts of lauryl-myristyl methacrylate, 2.5 parts of toluene, 0.2 part of a 50% solution of diisopropylbenzene hydroperoxide, and 0.04 part of 25% solution of diisobutylphenoxyethoxyethyl dimethyl benzyl ammonium chloride. After polymerization for 2.25 hours there is added over a 15-minute period a mixture of 2.25 parts of methoxypolyethylene glycol methacrylate average number molecular weight 425, 2.25 parts of 2-methyl-5-vinylpyridine, 0.02 part of 50% solution of diisopropylbenzene hydroperoxide, 0.02 part of 5% solution of the above quaternary ammonium chloride in n-hexanol, and 5 parts of toluene. The batch temperature is kept at 105–114° C. for the next 4 hours and thereafter at 104° C. Increments are supplied of 50% solution of diisopropylbenzene hydroperoxide, of a 5% solution of diisobutylphenoxyethoxyethyl dimethyl benzyl ammonium chloride, and toluene to totals of 0.22, 0.22, and 12.5 parts, respectively. Heating is discontinued at 6.25 hours. Then, 39 parts of toluene is added and the batch is allowed to cool with stirring. The resulting toluene solution contains by analysis 43.3% of the terpolymer. A toluene solution adjusted to 30% of terpolymer has a viscosity of 172 cs. at 100° F.

A portion of 69.7 parts of the 43.3% toluene solution is stirred and heated with 50 parts of light lubricating oil for 90 minutes at 105–110° C. at 10 mm. pressure. There results 86.1 parts of oil solution of the terpolymer. This is diluted to 30% of terpolymer with 14.4 parts of additional oil, and used in the tests. Only 0.125% of this copolymer is needed to disperse 0.4% of asphaltenes using the standard asphaltenes test procedure. This oil solution has a viscosity of 253 cs. at 210° F.

EXAMPLE 18

In the same manner as in the preceding example, laurylmyristyl methacrylate is about 50% polymerized. However, for the delayed addition the following monomeric mixture is used: 4 parts of methoxypolyethylene glycol methacrylate of molecular weight 425, one part of dimethylaminoethyl methacrylate, 5 parts of toluene, 0.025 part of 50% solution of diisopropylbenzene hydroperoxide, and 0.025 part of 5% solution of diisobutylphenoxyethoxyethyl benzyl dimethyl ammonium chloride. Treatment for the duration of this preparation is the same as that given in the preceding example. The resulting toluene solution contains by analysis 45.2% of copolymer. A portion of this toluene solution, adjusted to 30% of copolymer, gave a viscosity of 505 cs. at 100° F.

An oil solution of this copolymer is made by heating and stirring at 105–110° C./10 mm. for 90 minutes a mixture of 67.6 parts of toluene solution of 45.2% copolymer and 50 parts of 100 SUS lubricating oil. There results 85.8 parts of an oil solution with a viscosity of 413 cs. at 210° F. This is diluted to 30% of copolymer on adding 16.2 parts of additional lube oil as a convenient concentration for preparing oil blends. The asphaltenes test demonstrates good dispersing activity.

Other nitrogen-containing polymerizable monoethylenically unsaturated compounds may similarly be copolymerized with alkoxypolyethylene glycol acrylates or methacrylates. These include N-vinyl piperidinone, N-vinyl caprolactam, N - vinyl oxazolidinone, N - vinyl-5-ethyl-2-oxazolidinone, N-vinyl-6-methyl-2-oxazolidinone, N-(2-methacryloxyethyl)oxazolidinone, N-(2-methacryloxyethyl)-2-pyrrolidinone, N-alkylacrylamides, N-alkylmethacrylamides, dimethylacrylamide, N-vinyl succinimide, N,N'-dialkylaminoalkylacrylamides or methacrylamides, and tert-alkylaminoethyl acrylates or methacrylates.

EXAMPLE 19

In place of methoxypolyethylene glycol methacrylate of Example 16, there is used in a parallel procedure the same weight of butoxypolyethoxyethyl methacrylate of an average molecular weight of 1040. The final copolymer imparts a viscosity of 1375 cs. at 210° F. to a 30% solution in light petroleum oil. Only 2% is needed to disperse 0.4% of asphaltenes.

In place of the butoxypolyethylene glycol methacrylate there is used in the same process 38 parts of an octylphenoxypolyethoxyethyl methacrylate of an average molecular weight of 530. A 30% solution of the copolymer in light oil has a viscosity of 695 cs. at 210° F. For dispersing 0.4% of asphaltenes, only 2% of copolymer is needed.

In the same way a copolymer is made as in Example 16 with the ester consisting of hexanoyloxypolyethoxyethyl methacrylate of an average molecular weight of 650. The polymer at 30% in light petroleum oil imparts a viscosity of 890 cs. at 210° F. It disperses 0.4% of asphaltenes in the standard test at 2% of copolymer.

The above variations in copolymers all act as pour point depressants, 1% of copolymer giving a depression of 35° to 45° F. in typical oils having waxy pour points. They all give marked improvements in viscosity index.

Additional information bearing on molecular size and nature of illustrative copolymers is given in Table I.

Table I
VISCOSITY DATA FOR TYPICAL COPOLYMERS

| Copolymer of Example | Percent in oil | Centistokes at 210° F. | Percent in toluene | Centistokes at 100° F |
|---|---|---|---|---|
| 1c | 20 | 72.5 | 30 | 128 |
| 1d | | | 30 | 151 |
| 2 | 30 | 642 | 30 | 745 |
| 3 | 28.5 | 396 | | |
| 5 | 30 | 398 | | |
| 9 | 30 | 153 | | |
| 11 | 30 | 1,323 | | |
| 12 | 30 | 472 | 30 | 184 |
| 13 | | | 30 | 376 |
| 17 | 30 | 253 | 30 | 172 |
| 1c(1) | 20 | 44.4 | | |
| 1c(1) | 0 | ¹ 1.23 | | |
| 1c(2) | 20 | 27 | | |
| 1c(3) | 20 | 72.4 | | |
| 1c(4) | 20 | (²) | | |

¹ 3.5 at 100° F.  ² 71.8 at 100° F.

Typical specification properties of blends of copolymers in an oil are presented in Table II. The "pour" is the pour point determined by the A.S.T.M. method and the V.I. is calculated by the Dean-Davis method.

Table II
VISCOSITY AND POUR DATA OF BLENDS

| Copolymer of Example | Percent polymer in base oil | Viscosity, cs. 210° F. | Viscosity, cs. 100° F. | V.I. | Pour ° F. |
|---|---|---|---|---|---|
| Base oil | None | 6.36 | 45.36 | 97 | 0 |
| 1c | 1 | 7.67 | 51.70 | 120 | −40 |
| 1c | 2 | 9.55 | 60.83 | 134 | −50 |
| 2 | 1 | 7.99 | 54.88 | 119 | −45 |
| 2 | 2 | 10.21 | 68.89 | 130 | −45 |
| 5 | 1 | 7.73 | 53.77 | 116 | −45 |
| 5 | 2 | 9.59 | 65.65 | 127 | −50 |
| 12 | 1 | 8.06 | 54.90 | 121 | −40 |
| 12 | 2 | 10.39 | 68.35 | 133 | −45 |

EXAMPLE 20

Di-2-ethylhexylamine is treated with ethylene oxide to give an intermediate amine-monoethylene oxide adduct which has a neutral equivalent of 286.3 versus a theoretical value of 285.6 and a B.P. of 103°–104° C./0.14 mm. This material is then reacted with approximately 9 moles of ethylene oxide in the presence of an alkaline catalyst. There is obtained a di-2-ethylhexylamine polyethylene oxide adduct which contains an average of 10.3 ethylene oxide units per molecule. This is treated with methacryloyl chloride with benzene as a solvent and hydroquinone as inhibitor to give a dark brown viscous oil which is isolated as a stripped residue having a molecular weight of 763 and a bromine number of 2.38 (calculated 2.62).

This monomer is used in a delayed addition polymerization, using lauryl-myristyl methacrylate for the prepolymer. The procedure cited in the above examples is applied to a monomeric mixture I composed of 20.3 parts of lauryl methacrylate, 1.3 parts of toluene, and 0.1 part of a 50% solution of diisopropylbenzene hydroperoxide. Six and one-half parts of this monomeric mixture I and 0.02 part of a 25% solution of diisobutylphenoxyethoxyethyl dimethyl benzyl ammonium chloride are charged to the polymerization vessel, which is swept with nitrogen and heated at 122–123° C., and as soon as polymerization has started, the remainder of monomeric mixture I is charged gradually during 105 minutes. When the lauryl methacrylate is about 70% polymerized, another monomeric mixture II is charged gradually during 15 minutes. This consists of 5 parts of the above described di-2-ethylhexylaminopolyethoxyethyl methacrylate, 5 parts of toluene, 0.03 part of 50% solution of diisopropylbenzene hydroperoxide, and 0.03 part of 5% solution of diisobutylphenoxyethoxyethyl dimethyl benzyl ammonium chloride in n-hexanol. After 4 hours, the temperature of the heating bath is lowered to 113°

C. Increments of 50% solution of diisopropylbenzene hydroperoxide, of 5% solution of diisobutylphenoxyethoxyethyl dimethyl benzyl ammonium chloride, and of toluene added during the polymerization cycle total 0.11, 0.11, and 11.3 parts, respectively. At 6.5 hours, the batch is diluted with 21.8 parts of toluene and allowed to cool. There results 57.1 parts of slightly hazy solution which contains by analysis 31.5% copolymer. A toluene solution containing 30% of copolymer has a viscosity of 237 cs. at 100° F.

A portion of this toluene solution is used in preparing an oil solution. Only 0.1% of this copolymer disperses 0.4% of asphaltenes in oil.

The toluene solution is mixed with 100 neutral oil and the mixture is heated to 105° C. at 5 mm. pressure. The resulting oil solution is adjusted to a 30% copolymer content. This solution has a viscosity of 336.5 cs. at 210° F.

EXAMPLE 21

The procedure of Example 1, Part 1, is followed to prepare a prepolymer of lauryl-myristyl methacrylate to the extent of 86.5% polymerization during 6.5 hours. The polymer solution contains by analysis 68.4% of polymer. An aliquot of 7.6 parts of this polymer solution is charged to a reaction vessel, swept with nitrogen and heated at 105°–106° C. Then the following mixture is added to the hot prepolymer solution with stirring during 15 minutes: 6.0 parts of a tert-dodecylthiopoly(ethoxy)ethyl methacrylate which was prepared from dodecylthiopoly(ethoxy)ethyl alcohol containing approximately ten ethylene oxide units per molecule, 0.5 part of methyl methacrylate, 5.0 parts of toluene, 0.03 part of 50% solution of diisopropylbenzene hydroperoxide, and 0.03 part of 5% solution of diisobutylphenoxyethoxyethyl benzyl dimethyl ammonium chloride in n-butanol.

Two and one-fourth hours after this catalyzed delayed addition of monomer has been made, 2.5 parts of toluene with 0.008 part of 50% solution of diisopropyl benzene hydroperoxide and 0.008 part of 5% solution of diisobutylphenoxyethoxyethyl benzyl dimethyl-ammonium chloride in butanol is added. Two hours later, 10 parts of toluene is charged, and heating is discontinued. The batch is allowed to cool to room temperature with stirring. There results 21.5 parts of a toluene solution which analyzes 40.1% of copolymer. A portion is diluted to 30% of copolymer with additional toluene. At 100° F., the 30% solution of copolymer gives a viscosity of 606 centistokes.

A 30% solution of this copolymer in a 100 SUS neutral oil (made by stripping off the toluene and volatile matter) showed a viscosity of 358.9 centistokes at 210° F.

When this copolymer was used in the standard asphaltenes dispersancy test, only 2% of it was required to disperse 0.4% of asphaltenes completely. A copolymer made by the conventional copolymerization procedure, using the same raw materials, and in identical quantities, was a gel.

The procedure cited in previous examples for the delayed addition of alkoxypolyethylene glycol methacrylate is used to prepare a prepolymer from the following comonomer mixture:

32.5 parts of lauryl-myristyl methacrylate,
10.0 parts of styrene,
2.5 parts of toluene,
0.2 part of diisopropylbenzene hydroxide of 50% strength, and
0.04 part of 25% solution of diisobutylphenoxyethoxyethyl benzyl dimethyl ammonium chloride in n-butanol.

At 1.75 hours with the heating bath at 123° C. and the batch temperature at 114° C., there is charged during 15 minutes a mixture composed of:

7.5 parts of propoxypolyethylene glycol methacrylate of average molecular weight of 460,
5 parts of toluene,
0.04 part of 50% solution of diisopropylbenzene hydroperoxide, and
0.04 part of 5% solution of diisobutylphenoxyethoxyethyl benzyl dimethyl ammonium chloride.

After 4 hours, the temperature of the batch is lowered to 105° C. Increments of additional catalyst, activator, and toluene are added during the course of the copolymerization and amount to 0.20, 0.20, and 25 parts of 50% solution of diisopropylbenzene hydroperoxide in alcohol and ketone, of 5% solution of diisobutylphenoxyethoxyethyl benzyl dimethyl ammonium chloride in n-butanol and of toluene, respectively. At 6 hours, the batch is diluted with 25 parts of toluene, and at 6.3 hours it is allowed to cool to ambient temperature. The product is 114 parts of slightly hazy solution which contains by analysis 34.3% of copolymer. A portion of the product is diluted to 30% of copolymer in toluene. This solution has a viscosity of 9000 centistokes at 100° F.

This preparation is repeated with substitution of 7.5 parts of propoxypolyethylene glycol acrylate (molecular weight 445) for the above methacrylate. The product is a similar copolymer, although with somewhat higher molecular weight. A 30% solution of the copolymer in toluene has a viscosity of 9584 cs. at 100° F.

Both copolymers are effective dispersants in the standard asphaltenes test. Both give good improvement in the viscosity-temperature relationship of lubricating oils when dissolved therein.

Experience over a considerable period of time has demonstrated that copolymers which provide good dispersing action for asphaltenes improve the cleanliness of engines operated on petroleum fuels. Evaluations in engine operation are conveniently obtained by the FL-2 test procedure of the Coordinating Research Council (CRC).

In this procedure the same fuel and the same base oil are used for tests without and with a copolymer. A typical test is that made with the copolymer of Example 16, which was blended with base oil to give a composition containing 2% of copolymer. This blend has viscosities of 8.87 cs. at 210° F. and 52.02 cs. at 100° F. and a Viscosity Index of 140. The base oil contains as a stabilizer about 1% of a zinc dialkyl dithiophosphate.

Test data are summarized in Table III.

Table III

RATINGS FOR FL-2 TEST

| | Base oil alone | Blend with polymer |
|---|---|---|
| Part rated: | | |
| Valve deck | 8.0 | 9.0 |
| Rocker arm assembly | 8.0 | 9.0 |
| Cover plate | 7.0 | 9.0 |
| Push rod | 6.0 | 8.0 |
| Oil screen | 9.0 | 10.0 |
| Crank case oil pan | 6.5 | 9.0 |
| Push rod chamber | 4.0 | 6.0 |
| Oil ring slots | 8.0 | 8.9 |
| Sludge total | 56.5 | 68.9 |
| Varnish deposits: | | |
| Piston skirts | 6.2 | 8.3 |
| Cylinder walls | 4.1 | 7.3 |
| Varnish deposits total | 10.3 | 15.6 |
| Total | 66.8 | 84.5 |

There is evident a definite improvement in varnish deposits and there is also some improvement in the cleanliness of other engine parts. The latter improvement appears to be greater with the copolymers made according to the delayed addition method of this invention than with copolymers made by the conventional process.

Blends of the copolymers of this invention may be made with mineral lubricating oils or mixtures of two or more types of oils. There may be used from about 0.1% to about 10% of copolymer in a blend. For preparation of blends, it is most convenient to use a concentrate of copolymer in an oil or fluid which is of the type used in making the blend. For this purpose the concentrates have conveniently a copolymer content of 20% to 50%.

There may be used one or more other additives, such as anti-oxidants, anti-foam agents, anti-rust agents, anti-wear agents, heavy duty detergents, pour point depressants, viscosity index improvers, or other type of additive. For example, one or more of the dithiophosphates such as zinc dialkyl dithiophosphate, sulfurized oils, phenol sulfonates, or alkylaryl sulfonates or petroleum sulfonates whether normal or with alkaline reserve, polymers and copolymers from alkyl acrylates, methacrylates, itaconates, or fumarates or vinyl carboxylates and mixtures thereof; polybutenes, various silicones, alkyl or aryl phosphates, or many other oil additives may be present.

While a pour point depressant and a viscosity index improver may be added in addition to a copolymer of this invention, there may be used in place of such separate additives a copolymer of this invention which supplies not only dispersant action, but also one or both of these other actions. Thus, a copolymer which contains some alkyl groups of 16 or more carbon atoms, particularly cetyl or stearyl, together with smaller groups, such as myristyl, lauryl, or octyl, will lower the pour point of oils having a waxy pour point and at the same time improve temperature-viscosity relationships. Improvements in viscosity index can be emphasized by the choice of substituents and such improvements can be had without lowering of pour point if this is desired.

The influence of typical copolymers on these important properties is illustrated with typical copolymers in Table IV. Solutions of various copolymers were made in a 200 SUS viscosity midcontinent, solvent extracted neutral oil. It will be seen that there is a definite improvement in viscosity index with a marked lowering of pour point. In all cases there was also obtained effective dispersancy of asphaltenes.

*Table IV*

VISCOSITY AND POUR DATA OF TYPICAL COPOLYMERS

| Copolymer of— | Polymer conc., weight percent | Viscosity, cs. | | Viscosity index | ASTM pour point, ° F. |
|---|---|---|---|---|---|
| | | 210° F. | 100° F. | | |
| Base oil | 0.0 | 6.36 | 45.36 | 97 | 0 |
| Ex. 1c | 1.0 | 7.67 | 51.70 | 120 | −40 |
| | 2.0 | 9.55 | 60.83 | 134 | −50 |
| Ex. 2 | 1.0 | 7.99 | 54.88 | 119 | −45 |
| | 2.0 | 10.21 | 68.89 | 130 | −45 |
| Ex. 5 | 1.0 | 7.73 | 53.77 | 116 | −45 |
| | 2.0 | 9.99 | 65.65 | 127 | −50 |
| Ex. 12 | 1.0 | 8.06 | 54.90 | 121 | −40 |
| | 2.0 | 10.39 | 68.35 | 133 | −45 |

As has been indicated above, the copolymers of this invention may be dissolved and used not only in mineral lubricating oils, but also in synthetic lubricants, such as diesters and solutions of polyesters in diesters, alkyl silicates, and alkyl phosphates, and the like. Such solutions may serve not only as lubricants, but as hydraulic fluids. Greases may be made from these various compositions.

A typical synthetic lubricant for use as a turbojet lubricant is prepared by blending about 2 parts by weight of a concentrated solution of a copolymer prepared according to this invention (as in Example 2 when a 38.5% solution is made) with 97.5 parts of di-2-ethylhexyl sebacate of the grade used for lubricating purposes (Plexol 201) and dissolving therein 0.5 part of phenothiazine as an antioxidant to give blend A. The resulting composition has viscosities of 4.02 cs. at 210° F. and of 15.16 cs. at 100° F., giving a viscosity index of 188. A mixture of 0.5 part of phenothiazine in 99.5 parts of the same lot of dioctyl sebacate gives viscosities of 3.31 cs. at 210° F. and 12.74 cs. at 100° F. with a viscosity index of 150.

When blend A is subjected to the corrosion tests of Specification MIL-78-8, the data of Table V are obtained.

*Table V*

| Metal used | Corrosion, in mg./sq. in. | |
|---|---|---|
| | Corrosion found | Specification, plus or minus (max.) |
| Copper | −0.06 | 0.4 |
| Steel | +0.02 | 0.2 |
| Magnesium | +0.01 | 0.2 |
| Aluminum | +0.04 | 0.2 |
| Silver | +0.02 | 0.2 |

In the oxidation test of the same specification the change in viscosity of the composition is +1.31 and the change in neutralization number is +0.90. Limits according to the specification are +15 to −5 for viscosity changes and +2.0 max. for neutralization number.

A turbo prop lubricant is prepared by blending 2.8 parts of the above used solution of copolymer with 37.2 parts di-2-ethylhexyl sebacate and 60 parts of a mixture of polyesters formed by condensing 2-ethyl-1,3-hexanediol and sebacic acid and terminating the polyesters with 2-ethylhexanol, there being an average of about three glycol units per polymer molecule. This composition may also contain antioxidant, stabilizer, or other usual additive. The composition has viscosities of 7.68 cs. at 210° F., 36.90 cs. at 100° F., and 11,000 cs. at −40° F. with a viscosity index of 156.

Copolymers of this invention may also be used in fuel oils of various types, including furnace oils, kerosene, and jet fuels. Concentrations of copolymer from about 0.001% to 0.1% by weight are usually sufficient to disperse gum or resins which may form during storage. This prevents gums and resins from depositing on walls of containers or pipes or on screens.

An accelerated test for measuring the high-temperature stability of aviation turbine fuels uses an apparatus known as the CFR Fuel Coker which subjects the test fuel to temperatures and conditions similar to those occurring in some aviation turbine engines. Fuel is pumped at predetermined rates through a pre-heater section which simulates the hot fuel line sections of the engine as typified by an engine fuel-oil cooler. It then passes through a heated filter section which represents the nozzle area or small fuel passages in the hot section of the engine where fuel degradation products may become trapped. A precision sintered stainless steel filter in the heated filter section traps fuel degradation products formed during the test. The extent of the buildup is noted as an increased pressure drop across the test filter, and in combination with the deposit condition of the pre-heater, is used as an assessment of the fuel's high-temperature stability. (See ASTM Standards on Petroleum Products & Lubricants for 1957, Appendix XV, pp. 1059–1082, American Society for Testing Materials, Phila., Pa.)

In this procedure the pre-heater was held at 400° F. and the filter at 500° F. while there was tested a jet fuel (JP–4) which is a widecut blend of 70% of low octane gasoline and 30% kerosene with a Reid vapor pressure of 2 to 3 pounds and also a portion of this fuel oil to which there was added 0.02 percent by weight of a 34% solution in toluene of a copolymer prepared in accordance with Example 5 (about 0.007% of copolymer). The results are summarized in Table VI.

*Table VI*

DATA FROM FUEL COKER TEST

| Sample | Time, min. | Pressure drop, in. of Hg | Filter merit rating | Preheater tube rating |
|---|---|---|---|---|
| Fuel | 66 | 25 | 29 | Light tan at 66 min. |
| Fuel +0.007% polymer | 300 | 0 | 99 | Dark brown at 300 min. |

The standard asphaltenes dispersion test referred to herein is used to determine dispersing activity of copolymer in oil. Blends of copolymer are prepared in a 100 neutral oil over a range of concentrations, such as 2.0%, 1.0%, 0.5%, 0.25% and 0.125%. A sample of 10 ml. of a blend is mixed with 2 ml. of a standardized asphaltenes solution in chloroform. This solution is standardized at 20 mg. per ml. of asphaltenes which are obtained by oxidizing an asphaltic oil and collecting the pentane-insoluble asphaltenes formed. The mixtures of blend and asphaltenes solution are heated in test tubes at 150° C. for 2 hours in a forced draft oven. The tubes are cooled and the appearance noted. Clarity of the test mixture indicates good dispersancy. If at 2% of copolymer there is flocculation, the copolymer is considered not to be a dispersant.

I claim:

1. A process for preparing oil-soluble dispersing copolymers which comprises first polymerizing under the influence of a free radical polymerization initiator at least one polymerizable monoethylenically unsaturated monomer until 40% to about 90% thereof has polymerized, whereby a mixture of monomer and polymer is formed, said monomer being selected from at least one member of the class consisting of alkyl esters of acrylic, methacrylic, itaconic, fumaric, and maleic acids, vinyl esters of alkanoic acids, and mixtures of said esters, the average size of alkyl group in said esters being sufficiently large to impart solubility of copolymer in hydrocarbon oils and being at least eight carbon atoms, then adding to said mixture at least one ether ester of the formula $$CH_2=C(R^*)COO(C_nH_{2n}O)_x-R$$

wherein R* is a member of the class consisting of hydrogen and the methyl group, R is a member of the class consisting of alkyl, cycloalkyl, aralkyl, phenyl, $R_1R_2NC_nH_{2n}-$, $R_1SC_nH_{2n}-$, and $R_1COOC_nH_{2n}-$ groups, where $R_1$ and $R_2$ represent alkyl groups of 1 to 12 carbon atoms, $n$ has a value of 2–3, and $x$ has a value of 2–30, and copolymerizing the resulting mixture under the influence of a free radical polymerization initiator, the ether ester providing from 5 to 50% of the resulting copolymer.

2. A process for preparing oil-soluble dispersing copolymers which comprises first polymerizing under the influence of a free radical polymerization initiator at least one polymerizable monoethylenically unsaturated monomer until 40% to about 90% thereof has polymerized, whereby a polymerizing mixture of monomer and soluble polymer is formed, said monomer being selected from at least one member of the class consisting of alkyl esters of acrylic, methacrylic, itaconic, fumaric, and maleic acids, vinyl esters of alkanoic acids, and mixtures of said alkyl esters, the average size of alkyl group in said esters being sufficiently large to impart solubility of copolymer in hydrocarbon oils and being at least eight carbon atoms, together with a minor proportion of a member of the class consisting of styrene, acrylic acid, methacrylic acid, itaconic acid, maleic anhydride, maleic half esters, acrylonitrile, methacrylonitrile, vinyl alkyl ethers, and acrylamides, then adding to said polymerizing mixture at least one ether ester of the formula $$CH_2=C(R^*)COO(C_nH_{2n}O)_x-R$$

wherein R* is a member of the class consisting of hydrogen and the methyl group, R is a member of the class consisting of alkyl, cycloalkyl, aralkyl, phenyl, $R_1R_2NC_nH_{2n}-$, $R_2SC_nH_{2n}-$, and $R_1COOC_nH_{2n}-$ groups, where $R_1$ and $R_2$ represent alkyl groups of 1 to 12 carbon atoms, $n$ has a value of 2 to 3, and $x$ has a value of 2 to 30, and copolymerizing the resulting mixture under the influence of a free radical polymerization initiator, the ether ester providing from 5 to 50% of the resulting copolymer.

3. A process for preparing oil-soluble dispersing copolymers which comprises polymerizing in the presence of a free radical polymerization initiator at least one alkyl methacrylate until 40% to about 90% thereof has polymerized, whereby a polymerizing mixture of monomer and soluble polymer is formed, said alkyl methacrylate supplying an alkyl portion of sufficient size to impart solubility of copolymer in hydrocarbon oils and having an average size of at least 8 carbon atoms, then adding to said polymerizing mixture at least one ether ester of the formula $$CH_2=C(R^*)COO(C_nH_{2n}O)_x-R$$

wherein R* is a member of the class consisting of hydrogen and the methyl group, R is a member of the class consisting of alkyl, cycloalkyl, aralkyl, phenyl, $R_1R_2NC_nH_{2n}-$, $R_1SC_nH_{2n}-$, and $R_1COOC_nH_{2n}-$ groups, where $R_1$ and $R_2$ represent alkyl groups of 1 to 12 carbon atoms, $n$ has a value of 2 to 3, and $x$ has a value of 2 to 30, and copolymerizing the resulting mixture under the influence of a free radical polymerization initiator, the ether ester providing from 5 to 50% of the resulting copolymer.

4. A process according to claim 3 in which the free radical polymerization initiator comprises a hydroperoxide and a quaternary ammonium salt.

5. A process for preparing oil-soluble dispersing copolymers which comprises polymerizing in the presence of a free radical polymerization initiator at least one alkyl methacrylate until between 40% and 90% thereof has polymerized, whereby a mixture of polymer and monomer is formed, said alkyl methacrylate supplying an alkyl portion of sufficient size to impart solubility of the final copolymer in hydrocarbon oils and having an average size of at least eight carbon atoms, then adding to said mixture an ether ester of the formula $$CH_3(OCH_2CH_2)_xOC_2H_4OCOC(CH_3)=CH_2$$

where $x$ is a number from one to 29, and copolymerizing the resulting mixture under the influence of a free radical polymerization initiator, the ether ester providing from 5 to 50% of the resulting copolymer.

6. A process according to claim 5 in which the alkyl methacrylate is chiefly dodecyl methacrylate.

7. A process according to claim 5 in which the alkyl methacrylate polymer is derived in major proportion from alkyl methacrylates with alkyl groups of 12 to 18 carbon atoms.

8. A process according to claim 7 in which in addition to the alkyl methacrylate with alkyl groups of 12 to 18 carbon atoms there is used a minor proportion of at least one alkyl methacrylate with one to eight carbon atoms in the alkyl portion thereof.

9. A process for preparing oil-soluble dispersing copolymers which comprises polymerizing together in the presence of a free radical polymerization initiator at least one alkyl methacrylate and at least one dialkyl fumarate until between 40% and about 90% thereof has formed polymer, whereby a mixture of polymer and monomers is formed, said alkyl methacrylate and dialkyl fumarate supplying an alkyl portion of sufficient size to impart solubility to the final copolymer in hydrocarbon oils and having an average size of at least eight carbon atoms, then adding to said mixture an ether ester of the formula $$CH_3(OCH_2CH_2)_xOC_2H_4OCOC(CH_3)=CH_2$$

where $x$ is a number from one to 29, and copolymerizing the resulting mixture under the influence of a free radical polymerization initiator, the ether ester providing from 5 to 50% of the resulting copolymer.

10. A process for preparing oil-soluble dispersing copolymers which comprises polymerizing together in the presence of a free radical polymerization initiator at least one alkyl methacrylate and at least one dialkyl itaconate until between 40% and about 90% thereof has formed polymer, whereby a mixture of polymer and monomers is formed, said alkyl methacrylate and dialkyl itaconate supplying an alkyl portion of sufficient size to impart solubility to the final copolymer in hydrocarbon oils and having an average size of at least eight carbon atoms, then adding to said mixture an ether ester of the formula $$CH_3(OCH_2CH_2)_xOC_2H_4OCOC(CH_3)=CH_2$$

where $x$ is a number from one to 29, and copolymerizing the resulting mixture under the influence of a free radical polymerization initiator, the ether ester providing from 5 to 50% of the resulting copolymer.

11. A process for preparing oil-soluble dispersing copolymers which comprises polymerizing together in the presence of a free radical polymerization initiator at least one dialkyl fumarate and at least one vinyl ester of an alkanoic acid until 40% to about 90% thereof has formed polymer, whereby a mixture of polymer and monomers is formed, said dialkyl fumarate supplying an alkyl portion of an average size of at least eight carbon atoms and of sufficient size to impart solubility of final copolymer in hydrocarbon oils, then adding to said mixture an ether ester of the formula $$CH_3(OCH_2CH_2)_xOC_2H_4OCOC(CH_3)=CH_2$$

where $x$ is a number from one to 29, and copolymerizing the resulting mixture under the influence of a free radical polymerization initiator, the ether ester providing from 5 to 50% of the resulting copolymer.

12. A process for preparing oil-soluble dispersing copolymers which comprises polymerizing in the presence of a free radical polymerization initiator at least one vinyl alkanoate until 40% to about 90% thereof has polymerized, whereby a mixture of polymer and monomer is formed, said vinyl alkanoate supplying from the alkanoate residue an alkyl portion of at least eight carbon atoms and of sufficient size to impart to the final copolymer solubility in hydrocarbon oils, then adding to said mixture an ether ester of the formula $$CH_3(OCH_2CH_2)_xOC_2H_4OCOC(CH_3)=CH_2$$

where $x$ is a number from one to 29, and copolymerizing the resulting mixture under the influence of a free radical polymerization initiator, the ether ester providing from 5 to 50% of the resulting copolymer.

References Cited in the file of this patent

UNITED STATES PATENTS 2,129,694　　Izard _____ Sept. 13, 1938